Figure 1:
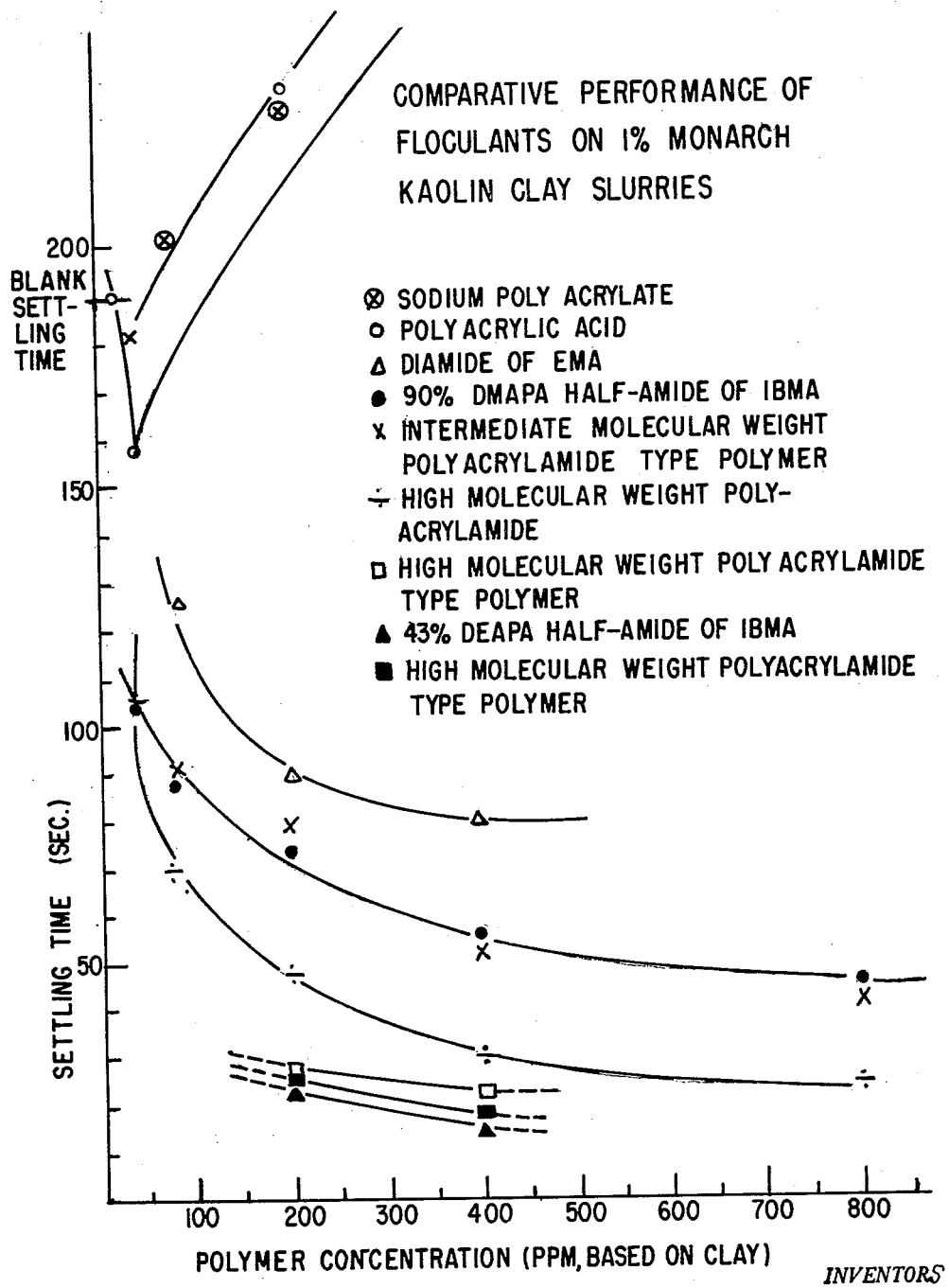

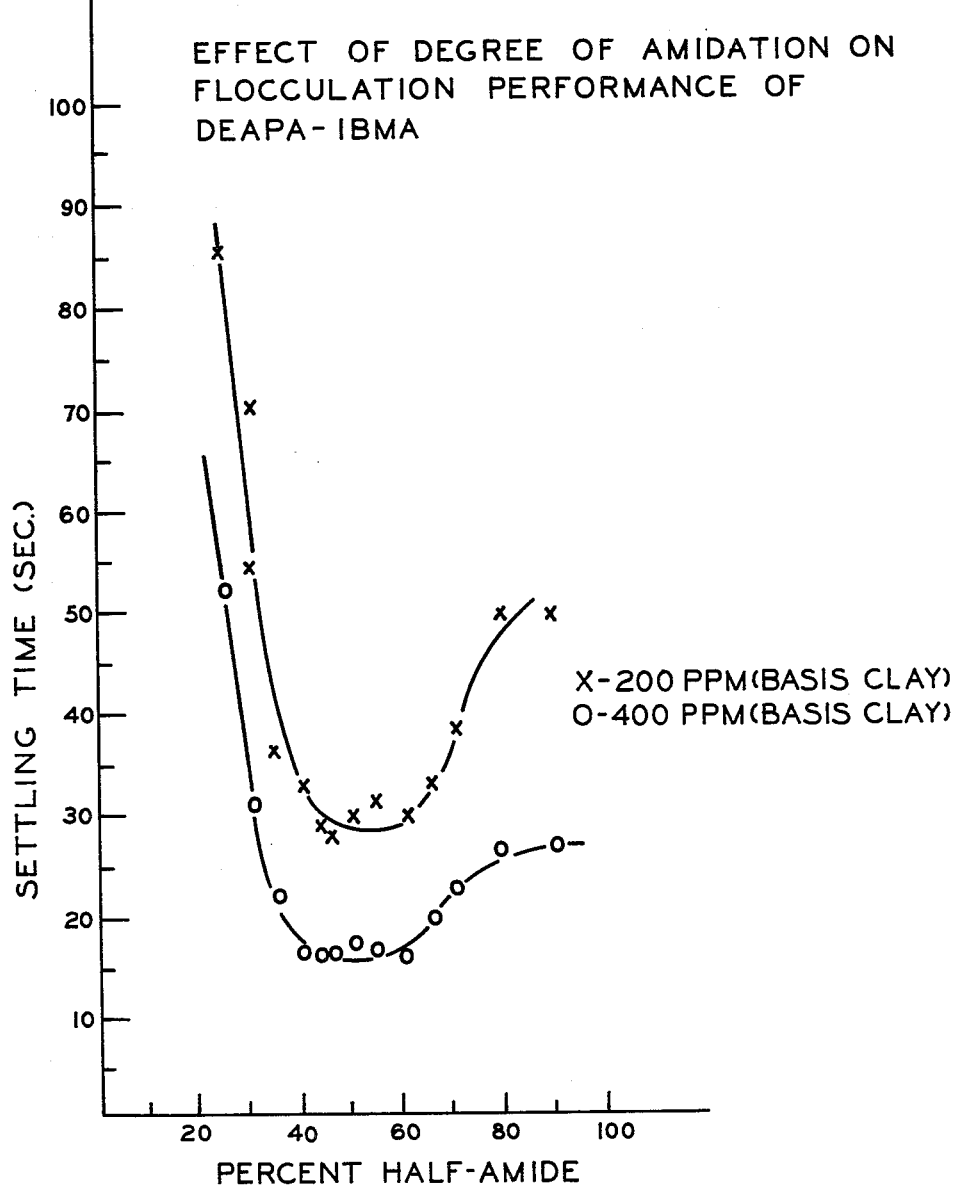

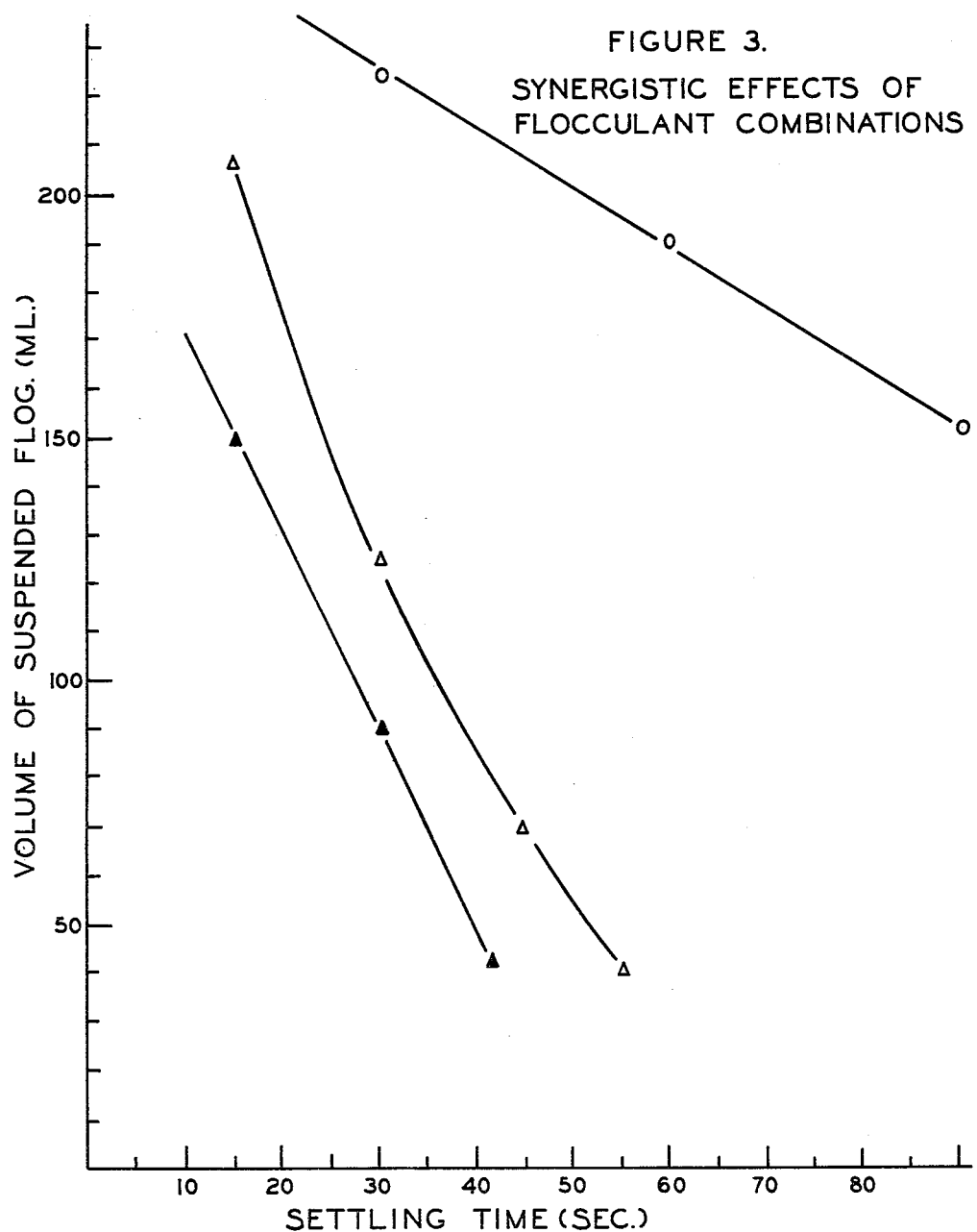

United States Patent Office 3,157,595
Patented Nov. 17, 1964

3,157,595
CLARIFICATION OF WATER WITH COPOLYMERS CONTAINING HALF-AMIDES OF OLEFINIC ANHYDRIDES
John H. Johnson, Ross M. Hedrick, and Joseph E. Fields, Dayton, Ohio, assignors to Monsanto Company, a corporation of Delaware
Filed Sept. 16, 1959, Ser. No. 840,284
30 Claims. (Cl. 210—54)

The present invention relates to a method for clarification of water containing suspended matter, new compositions of matter therefor and to a method of making these new compositions. This application is a continuation-in-part of copending application Serial No. 808,805, filed April 24, 1959, now abandoned.

According to the present invention clarification of water containing suspended particles of matter is effected by adding to such water, polymers of the formula

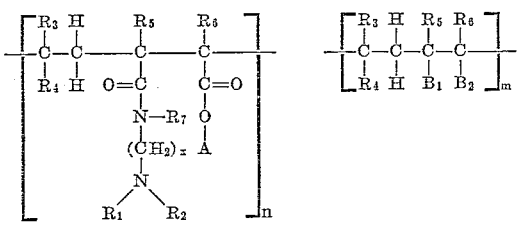

wherein $m+n=10$ to 10,000, preferably 100 to 5,000, with about 25 to 100%, preferably 35 to 70% being $n$'s and the balance $m$'s; A is hydrogen, an alkali metal, the ammonium radical, or mixtures thereof; $x$ is an integer of from 2 to 6; $R_1$ and $R_2$ singly are hydrogen, alkyl radicals having 1 to 4 carbon atoms, cyclohexyl radicals, monocyclic aromatic radical such as phenyl, tolyl or xylyl, provided not more than one of $R_1$ and $R_2$ is aromatic, and $R_1$ and $R_2$ taken together with the nitrogen atom to which they are attached are 5 or 6 membered ring heterocyclic radicals such as morpholino, piperidino, pyrrolino, pyrrolidino, pyrazoline, etc., or mixtures thereof; $R_3$ and $R_4$ are hydrogen, halogen (preferably bromine, chlorine, fluorine), alkyl radicals (preferably methyl and ethyl), alkoxy radicals having from 1 to 4 carbon atoms, carboxy, amide, amino, alkyl carboxylate esters with 1 to 4 carbon atoms in the alkyl group, alkanoate radicals having not more than 4 carbon atoms, phenyl radicals having from 0 to 2 halo (preferably chloro) substituents or 0 to 2 methyl groups, biphenyl,

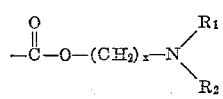

where $x$, $R_1$ and $R_2$ are defined hereinabove, or mixtures thereof, provided that not more than one of $R_3$ and $R_4$ are aromatic, alkoxy, carboxy, amide, amino, alkyl carboxylate ester radicals or

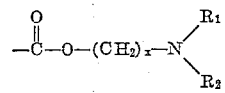

radicals, further provided that

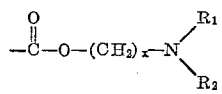

radicals as $R_3$ or $R_4$ can replace at least a part of the

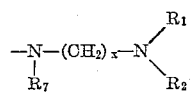

radicals; $R_5$ and $R_6$ are hydrogen, halogen (preferably chlorine), alkyl radicals having from 1 to 4 carbon atoms (preferably methyl), phenyl or mixtures thereof, provided that not more than one of $R_5$ and $R_6$ is phenyl; $R_7$ is hydrogen or an alkyl radical having from 1 to 4 carbon atoms (preferably methyl); and $B_1$ and $B_2$ taken together form an anhydride group and $B_1$ and $B_2$ taken separately are carboxyl, ammonium carboxylate, amide, monoalkyl or dialkyl substituted amide with each alkyl group not having more than 4 carbon atoms, alkali metal carboxylate, alkyl carboxylate ester radicals with the alkyl group having not more than 4 carbon atoms or mixtures thereof. Also the quaternary ammonium salts of these polymers where, e.g., alkyl halides are reacted with the nitrogen atom attached directly to the $R_1$ and $R_2$ to form quaternaries, are good water clarifying agents. All percentages are by weight unless otherwise indicated.

High molecular weight is particularly beneficial for flocculant use and normally it is preferred that the polymer used to make these flocculants have a specific viscosity in excess of about 0.3 as determined for a one percent solution of the polymer in dimethylformamide at 25° C. The amount of flocculating agent added to the water to be clarified should be such as to produce a concentration not in excess of about 0.1% by weight.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although subsurface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artificial bodies of water containing suspended solids. It may be applied to industrial water supplied either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation of the ultimate silt particles.

This is likewise true of particles of suspended material in industrial or sanitary waters. The ultimate particles of silt or other materials are therefore naturally somewhat aggregated by reason of the presence of such electrolytes. However, the forces binding such ultimate particles together are not great and moreover are not such as to generally effect either rapid settling rates of the flocculated material or strong enough to prevent deflocculation.

The compositions of the invention cause rapid flocculation and also reinforce the formed aggregates of particles causing a general tightening or bonding together of the initial particles and an increased rate of coagulation and settling, thus forming a less turbid supernatant liquid.

The addition of the compositions of the invention to the water suspension should be made in such a fashion that the resulting flocculation and aggregation of the particles takes place uniformly throughout the body of water. In order to obtain a uniform addition of the compositions of the invention to the water-borne suspension it is generally desirable to prepare a relatively dilute stock solution of the inventive compositions and then to add such solution to the body of water in the proportions indicated above. Clarification may take place either in the natural body of water or it may be caused to take place in hydraulic thickeners of known design.

The amount of inventive compositions to be employed will vary depending upon the amount and the degree of subdivision of the solids to be agglomerated or flocculated, the chemical nature of such solid and the particular inventive compositions employed. In general, not more than about 1,000 parts, but at least a sufficient amount to promote flocculation, of the inventive compositions are employed per million parts by weight of solid in suspension, and normally at least about 1 p.p.m. will be required. It is desired, of course, to employ sufficient of the inventive compositions so flocculation will take place without causing the formation of stable dispersions, i.e., a concentration of the inventive compositions in the treated water of not more than about 0.1% by weight (based on solids).

The precipitating action of the inventive compositions can be employed in the application of loading or filling materials to textiles or paper in order to obtain special effects. As an example, rosin size is often added to paper pulp prior to the formation of the sheet and precipitated in the aqueous pulp by aluminum sulfate (papermakers' alum). While admirably serving this purpose it is recognized that aluminum sulfate is objectionable not only because of its actual corrosiveness upon metals but also because of its hardening effect on organic substances such as cellulose.

By adding the inventive compositions to the paper machine beater, either prior to or after the addition of size or filler, complete precipitation can be achieved without the use of alum. The resulting paper is obtained thus substantially free of electrolytes and the white water is clear and free of suspended particles. In this connection a difficulty often encountered with alum when applying certain colors to paper, which difficulty is manifested by a weakening of the color, is also avoided.

One of the flocculant compositions of the invention, a 50% half-amide of N-(3-diethylaminopropyl)amine and isobutylene-maleic anhydride copolymer (IBMA) has been tested as a flocculant for paper pulp, as a clay retention aid and as a dry strength additive. In all three of these applications this composition of the invention shows promise when compared to commercially known compositions for these applications. In general the compositions of the invention are useful for these three paper applications, and the quaternaries especially are useful as dry strength additives for paper.

In the processing of fine mineral particles in aqueous suspension the inventive composition flocculating agents will be especially useful. In the processing of ores to separate valuable mineral constituents from undesirable matrix constituents, it is frequent practice to grind the ore into a finely-divided state to facilitate separation steps such as selective flotation and the like. In many ore dressing procedures, the finely-divided ore is suspended in water to form a pulp or slime. After processing, it is usually desirable to dewater the pulps or slimes either by sedimentation or filtering. In such operations, certain ores are particularly troublesome in that the finely-divided ore, when suspended in water, forms a stable slime which settles very slowly, if at all. Such slimes are unsuitable for concentration or dewatering by sedimentation and are difficult to dewater by filtration because of the tendency to clog the pores of the filter, thus leading to excessively time-consuming and inefficient operation of the filters. In some cases, for example, in certain phosphate mining operations, the formation of very stable suspensions of finely-divided mineral results not only in the loss of considerable valuable mineral as waste but also requires large expenditures for the maintenance of holding ponds for the waste. Similar problems are involved in processing gold, copper, nickel, lead, zinc, iron, such as taconite ores, uranium and other ores, and the inventive flocculating agents will be useful in these operations.

Some specific additional applications for the flocculating agent for the invention, not intended to be limiting but merely illustrative are listed below. The inventive composition can be used for the clarification of beers or wines during manufacture. Another use is in processing effluents in pharmaceutical operations for the recovery of valuable products or removal of undesirable by-products. A particularly important use for our flocculating agents is in the clarification of both beet sugar and cane sugar juices in their processing. Still another use is for flocculation and recovery of pigments from aqueous suspensions thereof. The inventive composition will be particularly useful in sewage treatment operations as a flocculating agent. A further use is to promote by flocculation the removal of coal from aqueous suspensions thereof. In other words the inventive composition flocculating agents of the invention are generally useful for processing aqueous effluents of all types to facilitate the removal of suspended solids.

The polymers are well known which are used as raw materials in making the flocculant compositions of the invention. For example, U.S. 2,047,398 teaches many of these useful anhydride copolymers and U.S. 2,615,845 teaches a few other of the useful anhydride copolymers. Generally, the copolymers, are prepared by reacting an olefinic compound or a mixture of olefins with an olefinic anhydride in the presence of an aliphatic or aromatic hydrocarbon which is a solvent for the monomer but is a non-solvent for the copolymer which is formed. Suitable solvents include benzene, toluene, xylene, chlorinated benzene, hexane, ethylene dichloride and the like. While benzoyl peroxide is commonly employed as the catalyst, other peroxide catalysts such as acetyl peroxide, di-tert-butyl peroxide or cumene hydroperoxide can be used instead. Instead of the peroxide catalyst, azo-type, e.g., $\alpha,\alpha'$-azodiisobutyronitrile, can be employed. The copolymer contains substantially equimolar quantities of the olefin moiety and the anhydride moiety. The properties of the copolymer, such as molecular weight, for example, can be regulated by proper choice of catalyst and control of one or more of the variables such as reactants, regulating agents, temperature, pressure and catalyst concentration. The product is obtained in solid form and is easily recovered by filtration, centrifugation, and the like. The copolymers thus obtained have the formula

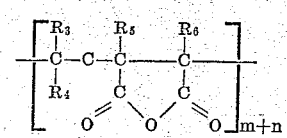

wherein $R_3$, $R_4$, $R_5$ and $R_6$, $m$ and $n$ are as defined hereinabove.

An illustrative list of suitable olefinic anhydride compounds useful in forming the anhydride copolymers of the invention is as follows: maleic anhydride, itaconic anhydride, α-chloro maleic anhydride, citraconic anhydride pyrocinchonic anhydride, α-phenyl maleic anhydride, α,α'-dichloro maleic anhydride, etc. The above listing of olefinic anhydrides is merely meant to be illustrative of anhydrides useful in making the copolymers and not limiting thereof.

An illustrative list of olefinic compounds suitable for reacting with the olefinic anhydrides to form the copolymers useful in making the compositions of the invention is as follows: vinyl or vinylidene compounds such as vinyl halides, e.g., vinyl chloride, vinyl bromide; vinylidene chloride; olefins such as ethylene, propylene, n-butylene, isobutylene; vinyl esters of carboxylic acids such as vinyl acetate, isopropenyl acetate, vinyl propionate, vinyl butyrate; esters of unsaturated acids such as methyl acrylate, ethyl acrylate, butyl acrylate, methyl methacrylate; vinyl aromatic compounds such as styrene, o-chlorostyrene, p-chlorostyrene, 2,5-dichlorostyrene, 2,4-dichlorostyrene, 6-ethylstyrene, p-vinyl toluene, vinyl naphthalene, α-methyl styrene, isopropenyl biphenyl; vinyl ethers such as vinyl methyl ether, vinyl isobutyl ether; acrylic acid, methacrylic acid, crotonic acid, acrylamide, methacrylamide, dimethylaminoethyl methacrylate, diethylaminopropyl acrylate, etc.

In addition to making them from copolymers the water clarifying compositions can be made from a mixture of more than two monomers, especially using three monomers to form terpolyymers. For example, ethylene, styrene, and maleic anhydride can be interpolymerized with peroxide cataylst to form a terpolymer useful in making water clarifying derivatives. Yet another example is the interpolymerization of isobutylene, dimethylaminoethyl methacrylate and maleic anhydride with an azo catalyst to form a terpolymer; and, this particular terpolymer is especially useful since at least a portion, if not all, of the diamine normally used to form the water clarifying compositions or flocculants can be dispensed with since the dimethylaminoethyl radical of the methacrylate will serve instead. Thus, the $R_3$'s or $R_4$'s can be mixtures of different radicals, and the same is true of the $R_5$'s, or $R_6$'s if a mixture of two different anhydrides is polymerized with an olefin or vinyl compound. Also if the $R_3$'s, $R_4$'s, $R_5$'s or $R_6$'s are reactive groups, such as hydroxyl, they can be made to be mixtures of different radicals merely by condensing at least a portion of these reactive groups with one or more other reactants which will join therewith. Also a third monomer to replace at least a part of the anhydride component could be used such a compound as N-(di-methylaminoethyl)maleimide and similar compounds.

The next step in making the new flocculants of the invention is to slurry anhydride copolymer in benzene, or other carrying medium such as was suggested for copolymer formation, and contact preferably at about room temperature (20°–25° C.) with the requisite amount of diamine. Higher temperatures than room temperature can be used but lower temperatures but the reaction proceeds quite satisfactorily and sufficiently fast at room temperature and higher temperatures tend to give side reactions forming flocculants which are not quite as effective as the flocculants made at room temperatures. Obviously, the process could be carried out without the presence of a slurrying medium such as benzene but the products formed would probably not be of as uniform quality and a slurrying medium is very desirable to disperse the copolymer for reaction. It is very desirable to have about 1 to 5% of water based on the amount of copolymer present in the reaction since this amount of water tends to speed the completeness of the reaction substantially. The reaction can be carried out without the presence of water but will normally take an appreciably longer time.

An illustrative list of suitable diamines to use in making the flocculant of the invention is as follows: N,N-dimethyl-1,2-ethylenediamine, N-methyl-N-ethyl-1,2-propylenediamine, N,N-dimethyl - 1,3 - propylenediamine, N,N-diethyl-1,3-propylenediamine, N-(3-aminopropyl)morpholine, N-aminoethylmorpholine, N,N-diethyl - 1,2 - propylenediamine, N,N-dipropyl-1,3-propylenediamine, N-propyl-N-methyl-1,3-propylenediamine, N,N-diisopropyl-1,3-propylenediamine, N,N-dibutyl - 1,3 - propylenediamine, N,N - diisobutyl-1,3-propylenediamine, N,N-(di-t-butyl)-1,3-propylenediamine, N,N,N'-trimethyl - 1,3 - propylenediamine, N,N-dimethyl-N'-ethyl - 1,3 - propylenediamine, N,N-dimethyl-N'-butyl - 1,3 - propylenediamine, N,N-dimethyl-1,2-isopropylenediamine, N,N-dimethyl-1,4-butylenediamine, N,N-diethyl - 2,3 - butylenediamine, N,N-dimethyl-1,3-isobutylenediamine, N,N - dimethyl-1,3-butylenediamine, N,N-dimethyl-t-butylenediamine, etc.

Rather than using the diamines listed in the paragraph immediately above diamines such as the following can be used provided precautions are taken to prevent crosslinking, namely: N-methyl-1,2-ethylenediamine, N-ethyl-1,2-propylenediamine, 3-aminopropyleneamine, etc. Flocculant or water clarifying properties of the compositions of the invention are appreciably reduced if the diamine used causes any substantial amount of crosslinking of the polymer, and when such unblocked diamines are used as are listed hereinabove in this paragraph, the polymer will be crosslinked unless they are blocked during reaction with the polymer until substantially all the anhydride groups are reacted. One method of blocking these diamines is the formation of such compounds as N-acetyl-N-methyl-1,2-ethylene diamine, etc. by, for example, reacting the diamine with acetyl chloride. After the blocked diamine is reacted with the polymer, then the blocking group can be removed, e.g., by hydrolysis, leaving the free hydrogens, or alternatively the acetyl groups need not be removed.

In making the flocculants of the invention normally it is preferred that no more diamine be used than would theoretically be required to make the half amide of the copolymer, i.e., not more than an equimolar quantity of diamine based on the number of anhydride groups present in the copolymer. Actually as will be seen in discussing the data below, especially with isobutylene-maleic anhydride copolymer, flocculants with optimum flocculating properties are formed when only sufficient diamine is used to form between about 35% and about 70% half amide, or to state it another way only about 17% to about 35% of all the carboxyl groups of the copolymer are reacted with the diamine to form the amide; however, flocculants having about 30% half amide are satisfactory. The balance of the anhydride groups which are unreacted or which are in the acid form can be left unreacted. However, to make the flocculant more soluble in water it is preferred to react the unreacted anhydride and carboxyl groups with ammonia or ammonium hydroxide to form ammonium salts and/or half amide half ammonium salts, thereby the flocculant is rendered appreciably more water-soluble. Alternatively, alkali metal salts can be formed using alkali metal hydroxides instead of ammonium hydroxide to increase water solubility.

The unreacted anhydride groups of the copolymer, of course, are readily hydrolyzed with water especially upon heating to yield the acid form. By reacting the unreacted anhydride groups and carboxyl groups with a stoichiometric quantity of ammonium hydroxide there is formed the ammonium salts and/or half amide half ammonium salts of these groups resulting in the formation of a flocculant of the general formula above. However, it is normally desirable to react only a portion of the unreacted anhydride groups and carboxyl groups with ammonia or ammonium hydroxide, an alkali metal hydroxide, a primary or secondary alkyl amine or a lower alkyl alcohol having not more than 4 carbon atoms in the alkyl groups, leaving the balance of the anhydride or carboxyl groups unreacted. If a lower alkyl $C_1$–$C_4$ alcohol is used to form esters, especially, it will normally be desirable to react only a portion of the unreacted anhydride and carboxyl groups, and the unreacted anhydride or carboxyl groups can be left unreacted or can be reacted with ammonium hydroxide or one or more of the other reactants named above. Thus it is seen that several different salt-forming, ester forming or amide forming reactants can be used in making the flocculant or water clarifying compositions of the invention. Also under certain conditions of use, it will be desirable to use several of the different salt forming or amide forming reactants named above to neutralize all or a portion of the anhydride or carboxyl groups.

In copending application Serial No. 765,953, filed October 8, 1958, are described methods of forming completely amidated (diamides) polymer or imides of the polymer. A certain amount of diamide or imides can be tolerated in the flocculant compositions of the invention, but normally reduced flocculant activity will result, especially if high temperatures are used in producing the diamide or imide. That is, a portion of the A's of the general formula and the oxygen to which the A's are directly attached can be replaced by the —$NH_2$ radical or primary or secondary alkyl amine radicals wherein the alkyl radicals have 1 to 4 carbon atoms, but normally this will result in reduced flocculant activity. Also an imide can be made wherein the nitrogen atom attached to $R_7$ in the general formula is attached directly to the adjacent carbonyl carbon atom, the $R_7$ and —O—A radicals necessarily being displaced. Furthermore, a portion of both $B_1$ and $B_2$ can be amide (or substituted amide as described hereinabove) radicals or taken together imide radicals, but again normally higher temperatures will be required to form the diamide or imide and reduced flocculant activity will result. Therefore, it can be said that a limited amount of imide or diamide can be tolerated in the flocculant compositions of the invention but is not preferred.

In making the quaternary water clarifying or flocculant compositions of the invention alkyl halides having not more than 4 carbon atoms in the alkyl groups can be used, especially desirable are the alkyl bromide or chlorides such as: methyl chloride, methyl bromide, ethyl chloride, ethyl bromide, n-propyl chloride, n-propyl bromide, isopropyl chloride, isopropyl bromide, n-butyl bromide, t-butyl chloride and t-butyl bromide. The iodides or fluorides such as ethyl iodide, n-propyl floride, etc., can also be used but are not as desirable. Also such compounds as benzyl halides, e.g., benzyl bromide or benzyl chloride, toluene sulfonates, dimethyl sulfate, etc. can be used as quaternizing agents. Another type of useful quaternizing agent is the α-halocarboxylic acids, especially bromo- or chloro-acetic acid. These quaternizing agents are simply contacted in stoichiometric proportions with the flocculant composition after the diamine has been reacted or after additional agents such as ammonia or ammonium hydroxide have been reacted. Mild heating can be used if desired, but normally room temperature contacting will be satisfactory to produce the quaternary ammonium salts, which like the material before quaternization are excellent flocculants.

The invention is further illustrated but not limited by the following examples.

Example 1

This example describes a polyacrylic acid having a specific viscosity of 2.248 determined in 1% concentration of the polymer in dimethylformamide at 25° C. This polymer is used for comparison as a flocculant with flocculants of the invention below.

A sample of this polyacrylic acid was substantially completely neutralized with sodium hydroxide and tested as a flocculant, data reported in FIGURE 1.

Example 2

This example describes the preparation of a completely amidated ethylene-maleic anhydride copolymer having a specific viscosity of 0.6 determined as described in Example 1. A completely amidated or diamide copolymer is formed as follows. An ethylene-maleic anhydride copolymer (EMA) having a specific viscosity of about 0.6 is converted to the half-amide, half-ammonium salt by passing ammonia into 350 grams of the stirred anhydride copolymer until heat evolution and ammonia absorption has ceased. There was thus obtained 450 grams of the amide salt, a white powder which dissolved to give a clear solution in water. The amide-salt was converted to the diamide by charging 100 grams thereof and 432 grams of liquid anhydrous ammonia to a rocking bomb, gradually heating the sealed bomb to 101° C. at which point the autogenous pressure was 1000 p.s.i. and continuing the heating at a temperature of about 100° C. for another 17 hours. The pressure at the end of this time was 925 p.s.i. The resulting brownish amber mass was broken up, removed from the bomb and dried in an oven at 58° C. for 12 hours under full vacuum to give the substantially pure diamide of the ethylene-maleic anhydride copolymer analyzing 18.7% nitrogen versus 19.72%, the calculated value for the polymer:

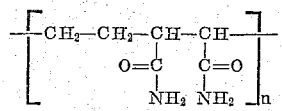

The diamide of this example is used for comparison with flocculants of the invention below.

Example 3

This example described the preparation of about a 90% half-amide of an isobutylene-maleic anhydride copolymer (IBMA) and dimethylaminopropylamine (DMAPA). The preparation of the isobutylenemaleic anhydride copolymer is as follows: The reaction vessel was a 300 p.s.i., a (Glascote) reactor fited with auxiliary equipment for temperature control, reflux, liquid reactant addition, stirrer, etc. To the kettle was charged 1690 lbs. of benzene, 134 lbs. of maleic anhydride, 141 lbs. of isobutylene, and 1.7 lbs. of benzoyl peroxide. The polymerization was carried out at a temperature of 54°–56° C. and a pressure of 5–10 p.s.i.g. for 6.7 hours to give about 60% conversion and at a temperature of about 68° C. for 2 hours to give substantially 100% conversion. The polymer slurry was dried over a period of about 15.8 hours in a 300 gal. Stokes rotary vacuum drier at a temperature of 78°–87° C. to give a dried product of 195.25 lbs.

A sample of isobutylene-maleic anhydride copolymer prepared in a manner similar to that described above was used in the preparation of the flocculant of the invention. Ten grams (0.0649 mole) of isobutylene-maleic anhydride copolymer, 50 ml. of benzene, and 7.35 ml. of dimethylaminopropylamine (0.0584 mole, 90% concentration) were stirred in a flask and heated for a half-hour. The reaction product was then filtered, washed with benzene, air dried for about 24 hours and dried in an oven for 15 minutes to yield 14.6 grams of a flocculant of the invention.

The experiment of this example was repeated using the same amount of isobutylene-maleic anhydride copolymer with 6.13 ml. of dimethylaminopropylamine (0.0487 mole) to give a 75% half-amide flocculant in a yield of 14.2 grams; 4.09 ml. of dimethylaminopropylamine (0.0325 mole) to give a 50% half-amide flocculant of the invention in 12.6 gram yield; and, 2.05 ml. of dimethylaminopropylamine (0.0162 mole) to give 11 gram yield of a 25% half-amide.

Example 4

This example describes several polyacrylamide type polymers which are commercially available and which are compared with the flocculants of the invention in FIGURE 1 below. Also included is a high molecular weight polyacrylamide. In general the higher molecular weight polymers will be more effective as flocculants. This has been indicated roughly in FIGURE 1. It should be noted that a distinction has been made between the one polyacrylamide and the polyacrylamide type polymers shown in FIGURE 1. It is possible that the polyacrylamide type polymers are not polyacrylamides per se but rather polyacrylamides which have been modified in some fashion to make them more effective as flocculants.

Example 5

This example describes the preparation of a flocculant of the invention made by reacting isobutylene-maleic anhydride copolymer (IBMA) with diethylaminopropylamine (DEAPA) to give a product having a 43.5% half-amide therein. A sample of 20 grams of isobutylene-maleic anhydride prepared in a manner similar to that described in Example 3 slurried in 250 ml. of benzene was added to the flask. Then 10 drops of water and 10 drops of isopropanol were added to the reaction mixture and over the period of about 5 minutes 18.6 ml. (15.4 grams) of diethylaminopropylamine was added dropwise to the reaction mixture (with stirring.) The reaction proceeded at about 26–30° C. At the end of one half-hour 200 ml. of hexane was added to the reaction mixture, the hexane and benzene were separated by filtration, and the product was washed repeatedly with hexane. A portion of the sample was air dried to give a fine white powder product being about 43.5% half-amide.

Example 6

This example describes the making of a flocculant of the invention from a styrene-maleic anhydride copolymer. To a reaction vessel with an agitator is charged 1100 parts of 1,1,2-trichloroethane as a reaction medium and 41 parts of maleic anhydride. The agitator is started, the reaction vessel closed and the charge brought to about 53° C. by steam coil heat. After the charge reaches the desired 53° C. temperature, hot water is circulated in the reaction vessel jacket to maintain temperature. Then the reaction vessel is opened and 45 parts of styrene and 0.22 part of benzoyl peroxide catalyst are added. The reaction vessel is again closed and $CO_2$ purging started and maintained throughout the reaction to blanket the reactants excluding air. After about 6 hours the reaction temperature is raised to about 60° C. and maintained at this temperature for about an additional 6 hours to complete the reaction. If the reaction appears to be slowing down, an additional amount of catalyst can be added during the run. After the reaction is complete, the reaction mixture is cooled to about 30° C. and the bulk of the trichloroethane is separated from the polymer by filtration. Then the greater part of the trichloroethane is removed by vacuum drying at about 90° C. over a few hours, and the drying finished at high vacuum and about 150° C. over a period of about 8 hours.

A sample of 10 grams (0.0995 mole) of styrene-maleic anhydride copolymer made in a manner similar to that described in the previous paragraph, 5.05 grams (0.0495 mole) of dimethylaminopropylamine and 50 ml. of toluene was heated on a steam bath overnight. The flocculant product was separated from the reaction mixture by filtration, was washed with benzene and then dried for about 1 hour in an oven at about 80°–100° C. The yield of product was about 14.2 grams. The resulting product was a good flocculant which can be made more water-soluble by reacting a part or substantially all of the unreacted anhydrides and free carboxyl groups with ammonium hydroxide to form ammonium salts and/or half-amide half-ammonium salts thereof.

Example 7

This example describes the making of a flocculant of the invention from an α-methylstyrene-maleic anhydride copolymer. A sample of α-methylstyrene-maleic anhydride copolymer formed by the method of Example 3 of U.S. 2,047,398 is reacted according to the method of Example 5 hereinabove using approximately an equal molar amount of diethylaminopropylamine based on the maleic anhydride present in the copolymer. Proportional amounts of benzene, water, isopropanol and later hexane are used. The resulting product is a good flocculant which can be made more water-soluble by reacting a part or substantially all of the unreacted anhydride and free carboxyl groups with ammonium hydroxide to form ammonium salts and/or half-amide half-ammonium salts thereof.

Example 8

A sample of vinyl acetate-maleic anhydride copolymer made according to the method of Example 4 of U.S. 2,047,398 is reacted according to the method of Example 5 hereinabove using approximately an equimolar portion of diethylaminopropylamine based on the maleic anhydride present in the copolymer. Proportional amounts of benzene, water, isopropanol and later hexane are used. The resulting product is a good flocculant, which can be made more water-soluble by reacting a part or substantially all of the unreacted anhydride and free carboxyl groups with ammonium hydroxide to form ammonium salts and/or half-amide half-ammonium salts thereof.

Example 9

A sample of vinyl ethyl-maleic anhydride copolymer formed by the method of Example 6 of U.S. 2,047,398 is reacted according to the method of Example 5 hereinabove using approximately an equimolar amount of diethylaminopropylamine based on the maleic anhydride present in the copolymer. Proportional amounts of benzene, water, isopropanol and later hexane are used. The resulting product is a good flocculant which can be made more water-soluble by reacting a part or substantially all of the unreacted anhydride and free carboxyl groups with ammonium hydroxide to form ammonium salts and/or half-amide half-ammonium salts thereof.

Example 10

A sample of vinyl chloride-phenyl maleic anhydride copolymer formed by the method of Example 21 of U.S. 2,047,398 is reacted according to the method of Example 5 hereinabove using approximately an equimolar amount of diethylaminopropylamine based on the maleic anhydride present in the copolymer. Proportional amounts of benzene, water, isopropanol and later hexane are used. The resulting product is a good flocculant which can be made more water-soluble by reacting a part or substantially all of the unreacted anhydride and free carboxyl groups with amomnium hydroxide to form ammonium salts and/or half-amide half-ammonium salts thereof.

Example 11

A sample of propylene-maleic anhydride copolymer formed according to the method of Example 1 of U.S. 2,615,845 is reacted according to the method of Example 5 hereinabove using approximately equimolar amounts of diethylaminopropylamine based on the maleic anhydride present in the copolymer. Proportional amounts of benzene, water, isopropanol and later hexane are used. The resulting product is a good flocculant which be made more water-soluble by reacting a part or substantially all of the unreacted anhydride and free carboxyl groups with ammonium hydroxide to form ammonium salts and/or half-amide half-ammonium salts thereof.

Example 12

A sample of ethylene-maleic anhydride copolymer formed by the method of Example 9 of U.S. 2,615,845 is reacted according to the method of Example 5 hereinabove using approximately an equimolar amount of diethylaminopropylamine based on the maleic anhydride present in the copolymer. Proportional amounts of benzene, water, isopropanol and later hexane are used. The resulting product is a good flocculant, which can be made more water-soluble by reacting a part or substantially all of the unreacted anhydride and free carboxyl groups with ammonium hydroxide to form ammonium salts and/or half-amide half-ammonium salts thereof.

The invention will be more clearly understood from the following detailed description of the accompanying drawings wherein:

FIGURE 1 is a graph showing comparative performances of flocculants on 1% Monarch Kaolin clay slurries;

FIGURE 2 is a graph showing the effect of the degree of amidation on flocculant performance of diethylaminopropylamine isobutylene-maleic anhydride polymer flocculants of the invention; and, FIGURE 3 is a graph showing synergistic effects of flocculant combinations of a polyacrylic acid flocculant and a diethylaminopropylamine isobutylene-maleic anhydride polymer flocculant of the invention which was about 90% half-amide.

In evaluating the flocculants of the invention, data of which is reported in FIGURES 1, 2 and 3, Monarch Kaolin clay with a natural pH of 5.25 was used. In the test procedure, the clay was slurried as a 1 percent suspension using a Waring Blendor at reduced (medium) speed. A 250 ml. graduated cylinder was filled to the mark and 0.5 ml. of a 1 percent solution of

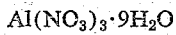

$Al(NO_3)_3 \cdot 9H_2O$ was added and carefully mixed with the slurry by inverting the stoppered graduate for five inversions. Then 0.5 ml. of a 0.1 percent solution of the flocculant to be tested (200 p.p.m., based on the clay) was added and again mixed by inverting the cylinder for five inversions taking care to avoid excessive agitation. In each case the flocculant had been converted to the ammonium salt and/or half-amide half-ammonium salts by reacting unreacted anhydride and carboxyl groups with ammonium hydroxide. For the first four cycles the cylinder was maintained at an angle not exceeding 60° from horizontal. On the fifth inversion, it was tipped through a vertical position to allow flocculated clay to disperse as uniformly as possible. It was then placed in an upright position and the settling rate was taken as the time necessary to settle the main body of the clay flocs. A background light was used to define the boundary. The suspension was then subjected to two additional series of five inversions noting improvements in settling time with each mixing. For the graphs of FIGURES 1 and 3, the minimum time of settling of the three series of five inversions was used. Then an additional 0.5 ml. of 0.1 percent polymer flocculant solution was added (making the total concentration 400 p.p.m. based on the clay) and the above mixing cycles and time measurements repeated. Again the minimum time of settling of the three cycles measured was used in FIGURES 1 and 3.

In FIGURE 1 a comparison is made with a number of commercial flocculants and flocculants of the invention. One of the known flocculants prepared is polyacrylic acid which is described in more detail in Example 1, and a sodium polyacrylate is also shown for comparison. The diamide flocculant which is also shown in the curves of FIGURE 1 is not a known flocculant of prior art. This diamide flocculant is described in more detail in Example 2. In Example 4 there are described the polyacrylamide flocculants, some of which are commercially available.

As indicated in Example 4, in general, the effectiveness as a flocculant will increase with increasing molecular weight for the polyacrylamides. The 90 percent dimethylaminopropylamine (DMAPA) half-amide of isobutylene-maleic anhydride copolymer (IBMA) is described in more detail in Example 3. The other flocculant of the invention compared in FIGURE 1, i.e., the 43.5 percent diethylaminopropylamine (DEAPA) half-amide of isobutylene maleic anhydride copolymer (IBMA) is described in detail in Example 5. The data of FIGURE 1 indicates that the best flocculant compositions of the invention are equal to or slightly superior to the best known polyacrylamides.

In FIGURE 2 the effect of the degree of amidation on flocculant performance of one of the flocculant compositions of the invention is shown. This flocculant is the diethylaminopropylamine (DEAPA) half-amide of isobutylene-maleic anhydride (IBMA) copolymer. This data indicates that optimum flocculation performance is obtained using a half-amide containing from about 25 to about 100% half-amide, preferably from about 35 to 70% half-amide. The flocculant compositions of the invention from which the data was obtained for FIGURE 2 were made in a manner similar to Example 5 above.

FIGURE 3 demonstrates the synergistic effect that can be obtained by using a combination of one or more flocculant compositions. In FIGURE 3, separate curves are shown for polyacrylic acid flocculation at 20 p.p.m. based on the clay which is the optimum concentration for polyacrylic acid as indicated in FIGURE 1. In a separate curve is shown the flocculation activity of a 90% dimethylaminopropylamine (DMAPA) half-amide of isobutylene maleic anhydride copolymer (IBMA) at 400 p.p.m. based on the clay. The third curve then shows the improved result obtained by using a combination of these two flocculants with the clay suspension being first treated with the polyacrylic acid, then with the flocculant of the invention.

The following examples illustrate the making and the testing of other excellent flocculant or water clarification compositions of the invention. The flocculant testing for these examples was carried out in the same manner as that described with relation to FIGURES 1, 2 and 3.

Example 13

A sample of 8.55 ml. (8.43 grams) of N-(3-aminoproply)morpholine was dissolved in 35 ml. of benzene and 10 grams of isobutylene-maleic anhydride copolymer (IBMA) was added with stirring. No detectable amount of heat was evolved during the polymer addition. The reactants were left in contact with one another without stirring at room temperature for 24 hours. The flocculant or water clarifying composition made in this experiment 13 was tested for flocculant activity with the following results: At 200 parts per million (p.p.m.) concentration of polymer based upon the amount of clay present, settling time was 33 seconds, at 400 p.p.m. settling time was 28 seconds and at 600 p.p.m. settling time was 16 seconds.

Example 14

This example describes the making of a flocculant of the invention from N-aminoethylmorpholine and IBMA. A sample of 7.6 ml. (7.6 grams) of N-aminoethylmorpholine was dissolved in 35 ml. of benzene and 10 grams of isobutylene-maleic anhydride copolymer (IBMA) was added with stirring to the amine solution. There was no detectable heat evolved during the addition of the polymer to the amine. After the addition of the polymer to the amine had been completed, the reaction mixture was allowed to stand at room temperature for 24 hours.

Very surprisingly, it has been found that the flocculants of the invention can be made in a water medium; whereas, it had previously been believed necessary to use a hydrocarbon medium, i.e., the hydrocarbon slurry process described in the examples hereinabove. This alternative process, i.e., the water process, comprises contacting the polymer and diamine in water. The reaction takes place quite satisfactorily at room temperature, and it is not desirable to carry out the reaction at temperatures substantially above room temperature since flocculant activity of the resulting product will be decreased. Mild heating of the reactants can be used if desired to speed the reaction. The water solubilizing against which is preferred to use can be added concurrently with the polymer and diamine in the process of making the flocculant, or, if desired, the water solubilizing agent can be added after the diamine or most of it has reacted with the polymer. The polymers, diamines and water solubilizing agents usable in the water medium process are the same as those described hereinabove as being usable in the hydrocarbon slurry process.

The water process or water medium process has some distinct and important advantages over the hydrocarbon slurry process. In the hydrocarbon slurry process it is necessary to recover the flocculant from the hydrocarbon and dry it prior to marketing. In the water process the ultimate user of the flocculant can make the flocculant as he needs it from the raw materials, i.e., by mixing the polymer, the dimaine and the water solubilizing agent in the proper proportions. Normally, the user will make up a flocculant concentrate in water, which he will use, although it is conceivable that under some conditions it might be desirable to make the flocculant in the water which it is desired to clarify.

The water or water medium process is further illustrated but not limited by the following examples.

*Example 15*

This example describes the making of a flocculant from (IBMA) and N-(3-diethylaminopropyl)amine. A sample of 4 grams (0.026 mole) of IBMA was added to a solution of 2.06 ml. (1.69 gram, 0.013 mole) of N-(3-diethylaminopropyl)amine and 1 ml. of ammonium hydroxide in 97 ml. of distilled water. The mixture of reactants was then agitated and soon became very viscous with some lumps of the material remaining undissolved. Agitation of the reaction mixture at room temperature was continued overnight. Then an additional 0.5 ml. of ammonium hydroxide was added, the reaction mixture was stirred to break up lumps and complete solution resulted. A sample of 10.25 grams of the solution (containing 0.4 g. of IBMA) was diluted to 400 ml., and 169 ml. of additional water was added to make a 0.1% polymer concentration in water. This product proved to be an excellent flocculant as illustrated by the following data. At a polymer concentration based on the clay present of 200 p.p.m. settling time was 33 seconds and at a polymer concentration of 400 p.p.m. settling time was 18 seconds.

*Example 16*

This example describes the preparation of a styrene-maleic anhydride copolymer flocculant of the invention. A sample of 4.0 grams (0.0198 mole) of styrene-maleic anhydride copolymer was added with stirring to 97 ml. of water containing 1.57 ml. (1.29 g., 0.0099 mole) of N-(3-diethylaminopropyl)amine and 0.7 ml. of ammonium hydroxide. The reaction mixture became very viscous, so an additional amount of 50 ml. of water was added. The reaction mixture was agitated overnight at room temperature. Then 0.3 ml. of ammonium hydroxide and 50 ml. of water was added to the reaction mixture to complete the formation of the flocculant.

*Example 17*

This example illustrates another preparation by the water method of an isobutylene-maleic anhydride flocculant of the invention. A sample of 4.0 grams of IBMA was added to 100 ml. of water containing 2.06 ml. of N-(3-diethylaminopropyl)amine and 1.5 ml. of ammonium hydroxide. The reaction mixture was agitated overnight after which time 8.0 grams of the reaction mixture was diluted to 425 ml. giving 0.1% water solution of the polymer. This flocculant was tested for flocculant activity with the following results. In the flocculant test at 200 p.p.m. of polymer based on clay, settling time was 44 seconds and at 400 p.p.m. settling time was 19 seconds.

*Example 18*

This example illustrates the preparation of another excellent flocculant of the invention from IBMA and N-(3-diethylaminopropyl)amine. A sample of 6.18 ml. (5.07 grams, 0.039 mole) of N-(3-diethylaminopropyl)-amine was dissolved in 300 ml. of water. To this diamine water solution was added 12 grams of IBMA using a Waring Blendor to mix the components. A suspension resulted very soon which became very viscous. The reaction mixture at first was strongly basic, but slowly over a period of ½ hour became very weakly basic. Then 3 ml. of ammonium hydroxide was added. The viscosity of the reaction mixture increased and the reaction mixture became less white but not transparent. The reaction mixture was stirred slowly occasionally in the Waring Blendor. A sample of 8.0 ml. of the reaction mixture was diluted to 427 ml. with water to give a 0.1% polymer solution in water. Flocculant testing of this polymer at 2000 p.p.m. gave a settling time of 41 seconds and at 400 p.p.m. 21 seconds.

Further flocculant testing was conducted on a sample of the flocculant of Example 18 to which had been added ammonium hydroxide till a perfectly clear solution resulted. The results of this flocculant testing at 200 p.p.m. polymer concentration was 45 seconds' settling time and at 400 p.p.m. 27 seconds' settling time.

*Example 19*

This example illustrates the preparation of a flocculant of the invention from IBMA and N-(3-dimethylaminopropyl)amine. A sample of 4.86 ml. (3.99 grams, 0.039 mole) of N-(3-dimethylaminopropyl)amine was dissolved in 300 ml. of water in a Waring Blendor. To this diamine solution was added 12 grams of isobutylene-maleic anhydride copolymer, with stirring. The reaction mixture became quite viscous and white with a few undissolved lumps. Stirring was continued of the reaction mixture for ½ hour at which time it was very weakly basic. Then 4.5 ml. of ammonium hydroxide was added, and the viscostiy and turbidity of the reaction mixture decreased. A sample of 8.0 ml. of the reaction mixture was diluted to 400 ml. to give a 0.1% polymer solution in water. Flocculant testing of the polymer at 200 p.p.m. gave a settling time of 31 seconds and at 400 p.p.m. 19 seconds.

*Example 20*

This example illustrates the preparation of a flocculant of the invention from IBMA and N-(2-diethylaminoethyl)amine. A sample of 4.53 g. (0.039 mole) of the diamine was added to 300 ml. of water in a Waring Blendor. To this amine solution was added 12.0 g. (0.078 mole) of IBMA with stirring. Stirring was continued for 45 minutes at which time the reaction mixture was weakly basic whereas previously it had been strongly basic. Then 4.5 ml. of concentrated ammonium hydroxide was added and stirring was continued for an additional ½ hour. The reaction product was a milky solution. A sample of 8.0 g. (5.16% product) of the milky solution was diluted to 412 ml. with water to give a 0.1% polymer product concentrated in water. Flocculant testing of the polymer at 200 p.p.m. gave a settling time of 43 seconds and at 400 p.p.m. 24 seconds.

*Example 21*

This example illustrates the influence on storage stability of the amount of ammonium hydroxide added to a flocculant from IBMA and N-(3-diethylaminopropyl) amine. A sample of 6.18 ml. (5.07 grams, 0.039 mol) of N-(3-diethylaminopropyl)amine was dissolved in 300 ml. of water. To this diamine water solution was added 12 grams of IBMA using a Waring Blendor to mix the components. A suspension resulted very soon which became very viscous. The reaction mixture at first was strongly basic, but slowly became less basic. After 15 minutes concentrated ammonium hydroxide (28% ammonia based on the ammonia-water solution) was added, the amount varying from 3.0 ml. in sample No. 1 to 10.0 ml. in sample No. 9. The polymer solutions were bottled and placed on a revolving wheel overnight to insure complete mixing. The next morning 8.0 g. from each sample was diluted with sufficient water to give a 0.1% solution of product of IBMA and N-(3-diethylaminopropyl)amine. These 0.1% solutions were used to test the flocculation time of the polymers at 200 p.p.m. and 400 p.p.m. as reported in the following table. Also reported in the same table is the flocculation time of these 0.1% solutions 13 days after preparation.

| Sample No. | Vol. NH₄OH (ml.) | Flocculation Settling Time | | | |
|---|---|---|---|---|---|
| | | 200 p.p.m. | | 400 p.p.m. | |
| | | Fresh Soln. | After 13 Days | Fresh Soln. | After 13 Days |
| 1 | 3.0 | 55 | 120 | 24 | 47 |
| 2 | 4.0 | 41 | 71 | 18 | 24 |
| 3 | 4.5 | 40 | 50 | 19 | 22 |
| 4 | 5.0 | 34 | 46 | 18 | 22 |
| 5 | 6.0 | 33 | 35 | 19 | 18 |
| 6 | 7.0 | 31 | 32 | 18 | 19 |
| 7 | 8.0 | 33 | 34 | 22 | 20 |
| 8 | 9.0 | 45 | 40 | 29 | 26 |
| 9 | 10.0 | 37 | 42 | 23 | 27 |

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. Polymers of the formula

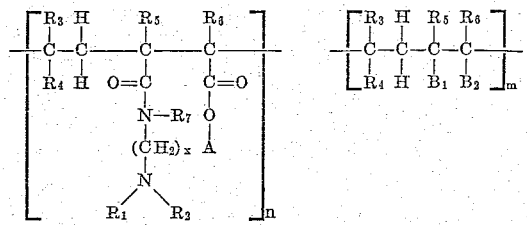

wherein $m+n$ is an integer in the range of about 10 to about 10,000 with 25 to 90% being $n$'s and the balance $m$'s, A is selected from the class consisting of hydrogen, alkali metals and the ammonium radical; $B_1$ and $B_2$ are selected from the class consisting of an anhydride group when taken together and when taken separately carboxyl, ammonium carboxylate, alkali metal carboxylate, alkyl carboxylate esters having no more than 4 carbon atoms in the alkyl groups, amide and alkyl-substituted amide radicals having not more than 4 carbon atoms in the alkyl groups; $x$ is an integer from 2 to 6; $R_1$ and $R_2$ are selected from the class consisting of the 5 to 6 membered heterocyclic radicals morpholino, piperidino, pyrrolino, pyrrolidino, pyrazoline and mixtures thereof when taken together and when taken separately alkyl radicals having not more than 4 carbon atoms, cyclohexyl radicals and phenyl radicals having not more than 2 methyl substituents, provided that not more than one of $R_1$ and $R_2$ is aromatic; $R_3$ and $R_4$ are selected from the group consisting of hydrogen, halogens, alkyl radicals having not more than 4 carbon atoms, alkoxy radicals having not more than 4 carbon atoms, carboxy radicals, amide radicals, amino radicals, alkanoate radicals having not more than 4 carbon atoms, alkyl carboxylate esters having not more than 4 carbon atoms in the alkyl groups, phenyl radicals having not more than 2 halo and 2 methyl substituents and

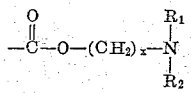

radicals where $x$, $R_1$ and $R_2$ are as defined hereinabove, provided that not more than one of $R_3$ and $R_4$ is an aromatic, alkoxy, carboxy, amide, amino, alkanoate, alkyl carboxylate ester and a

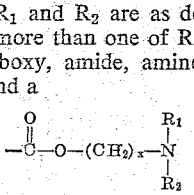

radicals; $R_5$ and $R_6$ are selected from the class consisting of hydrogen, halogen, phenyl and alkyl radicals having not more than 4 carbon atoms, provided that not more than one of $R_5$ and $R_6$ is a phenyl radical; and, $R_7$ is selected from the class consisting of hydrogen and alkyl radicals having not more than 4 carbon atoms.

2. A method of treating water containing suspended particles to promote the settling of said particles comprising adding to said water polymers of the formula

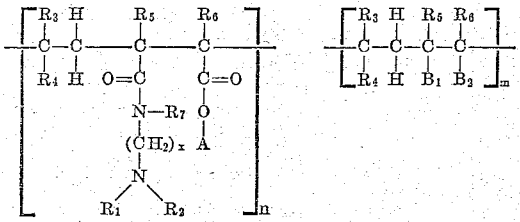

wherein $m+n$ is an integer in the range of about 10 to about 10,000 with 25 to 90% being $n$'s and the balance $m$'s, A is selected from the class consisting of hydrogen, alkali metals and the ammonium radical; $B_1$ and $B_2$ are selected from the class consisting of an anhydride group when taken together and when taken separately carboxyl, ammonium carboxylate, alkali metal carboxylate, alkyl carboxylate esters having not more than 4 carbon atoms in the alkyl groups, amide and alkyl-substituted amide radicals having not more than 4 carbon atoms in the alkyl groups; $x$ is an integer from 2 to 6; $R_1$ and $R_2$ are selected from the class consisting of the 5 to 6 membered heterocyclic radicals morpholino, piperidino, pyrrolino, pyrrolidino, pyrazoline and mixtures thereof when taken together and when taken separately alkyl radicals having not more than 4 carbon atoms, cyclohexyl radicals and phenyl radicals having not more than 2 methyl substituents, provided that not more than one of $R_1$ and $R_2$ is aromatic; $R_3$ and $R_4$ are selected from the group consisting of hydrogen, halogens, alkyl radicals having not more than 4 carbon atoms, alkoxy radicals having not more than 4 carbon atoms, carboxy radicals, amide radicals, amino radicals, alkanoate radicals having not more than 4 carbon atoms, alkyl carboxylate esters having not more than 4 carbon atoms in the alkyl groups, phenyl radicals having not more than 2 halo and 2 methyl substituents and

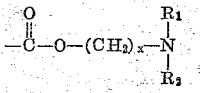

radicals where $x$, $R_1$ and $R_2$ are as defined hereinabove, provided that not more than one of $R_3$ and $R_4$ is an aromatic, alkoxy, carboxy, amide, amino, alkanoate, alkyl carboxylate ester and a

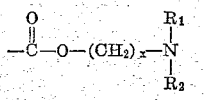

radicals; $R_5$ and $R_6$ are selected from the class consisting of hydrogen, halogen, phenyl and alkyl radicals having not more than 4 carbon atoms, provided that not more than one of $R_5$ and $R_6$ is a phenyl radical; and, $R_7$ is selected from the class consisting of hydrogen and alkyl radicals having not more than 4 carbon atoms; the amount of said polymers which is added being such as to produce in said water a concentration not in excess of about 0.1% by weight basis solids but at least a sufficient amount to promote the settling of suspended particles.

3. A method of making polymers of the formula

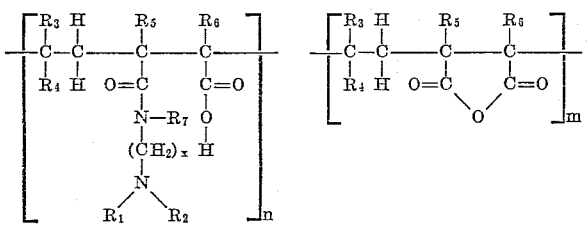

wherein $m$ and $n$ is an integer in the range of about 10 to about 10,000 with 25 to 90% being $n$'s and the balance $m$'s, x is an integer from 2 to 6; $R_1$ and $R_2$ are selected from the class consisting of the 5 to 6 membered heterocyclic radicals morpholino, piperidino, pyrrolino, pyrrolidino, pyrazoline and mixtures thereof when taken together and when taken separately alkyl radicals having not more than 4 carbon atoms, cyclohexyl radicals and phenyl radicals having not more than 2 methyl substituents, provided that not more than one of $R_1$ and $R_2$ is aromatic; $R_3$ and $R_4$ are selected from the group consisting of hydrogen, halogens, alkyl radicals having not more than 4 carbon atoms, alkoxy radicals having not more than 4 carbon atoms, carboxy radicals, amide radicals, amino radicals, alkanoate radicals hving not more than 4 carbon atoms, alkyl carboxylate esters having not more than 4 carbon atoms in the alkyl groups, phenyl radicals having not more than 2 halo and 2 methyl substituents and

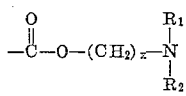

radicals where $x$, $R_1$ and $R_2$ are as defined hereinabove, provided that not more than one of $R_3$ and $R_4$ are aromatic, alkoxy, carboxy, amide, amino, alkanoate, alkyl carboxylate ester and

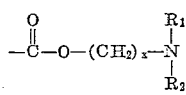

radicals; $R_5$ and $R_6$ are selected from the class consisting of hydrogen, halogen, phenyl and alkyl radicals having not more than 4 carbon atoms, provided that not more than one of $R_5$ and $R_6$ is a phenyl radical; and, $R_7$ is selected from the class consisting of hydrogen and alkyl radicals having not more than 4 carbon atoms, comprising contacting in water polymeric anhydrides of the formula

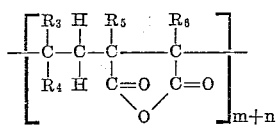

wherein $R_3$, $R_4$, $R_5$, $R_6$, $m$ and $n$ are as described hereinabove, with a sufficient amount to form said polymers of diamines of the formula

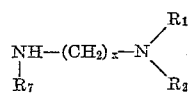

wherein $R_1$, $R_2$, $R_7$ and $x$ are as described hereinabove, provided that if $R_1$ is hydrogen the hydrogen is blocked prior to contacting.

4. Flocculant compositions comprising water as the major component and about 0.1% based on said water of polymers of claim 1.

5. Polymers of claim 1 wherein $m+n$ are in the range of about 100 to about 5,000.

6. Polymers of claim 1 wherein from about 35 to about 70% of $m+n$ are $n$'s.

7. Quaternary ammonium salts of polymers of claim 1.

8. Polymers of claim 1 wherein at least a portion of A is the ammonium radical, at least a portion of $B_1$ is the amide radical and at least a portion of $B_2$ is the ammonium carboxylate radical.

9. Polymers of claim 1 wherein $m+n$ are in the range of about 100 to about 5,000, X is 3, $R_1$ and $R_2$ are alkyl radicals having not more than 4 carbon atoms, $R_3$ and $R_4$ are methyl radicals, $R_5$, $R_6$ and $R_7$ are hydrogen, A is hydrogen, and $B_1$ and $B_2$ are taken together to form an anhydride group.

10. Polymers of claim 9 wherein at least a portion of A is the ammonium radical, at least a portion of $B_1$ is the amide radical and at least a portion of $B_2$ is the ammonium carboxylate radical.

11. Polymers of claim 1 wherein $m+n$ are in the range of about 100 to about 5,000, X is 3, $R_1$ and $R_2$ taken together with the nitrogen to which they are attached form the morpholino radical, $R_3$ and $R_4$ are methyl radicals, $R_5$, $R_6$ and $R_7$ are hydrogen, A is hydrogen, and $B_1$ and $B_2$ are taken together to form an anhydride group.

12. Polymers of claim 11 wherein at least a portion of A is the ammonium radical, at least a portion of $B_1$ is the amide radical and at least a portion of $B_2$ is the ammonium carboxylate radical.

13. A method of claim 2 wherein $m+n$ are in the range of about 100 to about 5,000.

14. A method of claim 2 wherein from about 35 to about 70% of $m+n$ are $n$'s.

15. A method of claim 2 wherein quaternary ammonium salts of the polymers are used instead of the polymers.

16. A method of claim 2 wherein at least a portion of A is the ammonium radical, at least a portion of $B_1$ is the amide radical, and at least a portion of $B_2$ is the ammonium carboxylate radical.

17. A method of claim 2 wherein said polymers are added to said water in an amount not in excess of about 1,000 p.p.m. based on suspended particles in said water but in amount sufficient to promote settling of said particles.

18. A method of claim 17 wherein $m+n$ are in the range of about 100 to about 5,000, X is 3, $R_1$ and $R_2$ are alkyl radicals having not more than 4 carbon atoms, $R_3$ and $R_4$ are methyl radicals, $R_5$, $R_6$ and $R_7$ are hydrogen, A is hydrogen, and $B_1$ and $B_2$ are taken together to form an anhydride group.

19. A method of claim 18 wherein at least a portion of A is the ammonium radical, at least a portion of $B_1$ is the amide radical, and at least a portion of $B_2$ is the ammonium carboxylate radical.

20. A method of claim 17 wherein $m+n$ are in the range of about 100 to about 5,000, X is 3, $R_1$ and $R_2$ taken together with nitrogen to which they are attached form the morpholino radical, $R_3$ and $R_4$ are methyl radicals, $R_5$, $R_6$ and $R_7$ are hydrogen, A is hydrogen, and $B_1$ and $B_2$ are taken together to form an anhydride group.

21. A method of claim 20 wherein at least a portion of A is the ammonium radical, at least a portion of $B_1$ is the amide radical, and at least a portion of $B_2$ is the ammonium carboxylate radical.

22. A method of claim 3 wherein $m+n$ are in the range of about 100 to about 5,000.

23. A method of claim 3 wherein from about 35 to about 70% of $m+n$ are $n$'s.

24. A method of claim 3 wherein $m+n$ are in the range of about 100 to about 5,000, X is 3, $R_1$ and $R_2$ are alkyl radicals having not more than 4 carbon atoms, $R_3$ and $R_4$ are methyl radicals, $R_5$, $R_6$ and $R_7$ are hydrogen, A is hydrogen, and $B_1$ and $B_2$ are taken together to form an anhydride group.

25. A method of claim 3 wherein $m+n$ are in the range of about 100 to about 5,000, X is 3, $R_1$ and $R_2$ taken together with nitrogen to which they are attached form the morpholino radical, $R_3$ and $R_4$ are methyl radicals, $R_5$, $R_6$ and $R_7$ are hydrogen, A is hydrogen, and $B_1$ and $B_2$ are taken together to form an anhydride group.

26. A method of claim 3 wherein third reactants are added selected from the class consisting of ammonium hydroxide, alkali metal hydroxides, lower alkyl alcohols having not more than 4 carbon atoms in the alkyl groups, and primary and secondary alkyl amines having not more than 4 carbon atoms in the alkyl groups, forming derivatives of the polymers of claim 3.

27. A method of claim 26 wherein at least a portion of said third reactants is added to a water solution of said diamine prior to the addition of said polymers to the water.

28. A method of claim 26 wherein said third reactant is ammonium hydroxide.

29. A method of claim 26 wherein at least a portion of said third reactants is added to the water after at least most of said diamine has reacted with said polymeric anhydrides.

30. A method of claim 29 wherein said third reactant is ammonium hydroxide.

References Cited in the file of this patent

UNITED STATES PATENTS

| | | |
|---|---|---|
| 2,625,529 | Hedrick et al. | Jan. 13, 1953 |
| 2,649,438 | Bruson | Aug. 18, 1953 |
| 2,695,227 | Lebedeff | Nov. 23, 1954 |
| 2,725,367 | Niederhauser | Nov. 29, 1955 |
| 2,771,996 | Hulot | Nov. 27, 1957 |
| 2,821,521 | Price | Jan. 28, 1958 |
| 2,857,365 | Johnson | Oct. 21, 1958 |
| 2,977,334 | Zohf et al. | Mar. 28, 1961 |

UNITED STATES PATENT OFFICE
CERTIFICATE OF CORRECTION

Patent No. 3,157,595                      November 17, 1964

John H. Johnson et al.

It is hereby certified that error appears in the above numbered patent requiring correction and that the said Letters Patent should read as corrected below.

Column 5, line 24, for "6-ethylstyrene" read -- p-ethylstyrene --; line 33, for "terpolyymers" read -- terpolymers --; column 7, lines 48 and 49, for "n-butyl bromide" read -- n-butyl chloride, n-butyl bromide, isobutyl chloride, isobutyl bromide, --.

Signed and sealed this 6th day of April 1965.

(SEAL)
Attest:

ERNEST W. SWIDER
Attesting Officer

EDWARD J. BRENNER
Commissioner of Patents